US009363850B2

(12) United States Patent
Johansson et al.

(10) Patent No.: US 9,363,850 B2
(45) Date of Patent: Jun. 7, 2016

(54) COMMUNICATION SYSTEMS AND METHODS IN A COMMUNICATION SYSTEM

(75) Inventors: Bernt Johansson, Värmdö (SE); Jacob Österling, Järfälla (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 929 days.

(21) Appl. No.: 13/378,839

(22) PCT Filed: Nov. 24, 2011

(86) PCT No.: PCT/SE2011/051419
§ 371 (c)(1),
(2), (4) Date: Dec. 16, 2011

(87) PCT Pub. No.: WO2013/077790
PCT Pub. Date: May 30, 2013

(65) Prior Publication Data
US 2013/0136068 A1   May 30, 2013

(51) Int. Cl.
*H04W 88/08*   (2009.01)
*H04W 28/04*   (2009.01)
*H04W 72/04*   (2009.01)

(52) U.S. Cl.
CPC ............ *H04W 88/085* (2013.01); *H04W 28/04* (2013.01); *H04W 72/04* (2013.01); *H04W 88/08* (2013.01)

(58) Field of Classification Search
CPC ... H04W 88/085; H04W 28/04; H04W 72/04; H04W 88/08
See application file for complete search history.

(56) References Cited

U.S. PATENT DOCUMENTS

| | | | |
|---|---|---|---|
| 6,850,764 B1* | 2/2005 | Patel | 455/450 |
| 7,502,354 B1* | 3/2009 | Maufer | 370/338 |
| 7,774,468 B1* | 8/2010 | Nag et al. | 709/226 |
| 2002/0141512 A1 | 10/2002 | Blanke | |
| 2003/0069042 A1* | 4/2003 | Sato et al. | 455/561 |
| 2005/0153697 A1* | 7/2005 | Patel | 455/442 |
| 2005/0245267 A1 | 11/2005 | Guethaus | |

(Continued)

FOREIGN PATENT DOCUMENTS

EP    1 713 290 A1    10/2006

OTHER PUBLICATIONS

International Search Report and Written Opinion of the International Searching Authority, PCT/SE2011/051419, Sep. 21, 2012.

*Primary Examiner* — Khaled Kassim
(74) *Attorney, Agent, or Firm* — Patents on Demand, P.A.; Brian K. Buchheit; Scott M. Garrett (57) ABSTRACT

Communication systems and methods in a communication system for allocating an amount of baseband resource in one of a plurality of digital units to a radio unit serving a cell are provided. The methods include estimating the amount of the baseband resource to be allocated to the radio unit, identifying a digital unit of the plurality of digital units on which a neighbor radio unit, serving a neighbor cell, situated in a geographical vicinity of the cell is allocating baseband resource, determining that the digital unit has available baseband resource of the estimated amount, and if so, allocating the estimated amount of baseband resource in the digital unit to the radio unit.

25 Claims, 6 Drawing Sheets

(56) References Cited

U.S. PATENT DOCUMENTS

| | | | |
|---|---|---|---|
| 2006/0073846 A1* | 4/2006 | Drury et al. | 455/552.1 |
| 2006/0160551 A1* | 7/2006 | Matoba et al. | 455/509 |
| 2007/0054667 A1* | 3/2007 | Lee et al. | 455/434 |
| 2007/0133500 A1* | 6/2007 | Rajkotia et al. | 370/348 |
| 2008/0159249 A1* | 7/2008 | Takahashi et al. | 370/343 |
| 2009/0029710 A1* | 1/2009 | Ochiai et al. | 455/450 |
| 2009/0149221 A1* | 6/2009 | Liu et al. | 455/561 |
| 2009/0285121 A1* | 11/2009 | Tzannes | 370/254 |
| 2010/0075688 A1* | 3/2010 | Watanabe | 455/450 |
| 2010/0227624 A1* | 9/2010 | De Pasquale et al. | 455/452.2 |
| 2010/0296596 A1* | 11/2010 | Miyamoto | 375/260 |
| 2011/0136455 A1* | 6/2011 | Sundstrom et al. | 455/196.1 |
| 2011/0211478 A1* | 9/2011 | Calvert et al. | 370/252 |
| 2012/0002537 A1* | 1/2012 | Bao et al. | 370/221 |
| 2012/0039293 A1* | 2/2012 | Feng et al. | 370/329 |
| 2012/0099460 A1* | 4/2012 | Murakami et al. | 370/252 |
| 2012/0147824 A1* | 6/2012 | Van der Merwe et al. | 370/329 |
| 2012/0214498 A1* | 8/2012 | Joko | 455/449 |
| 2012/0269110 A1* | 10/2012 | Walker et al. | 370/312 |
| 2012/0269155 A1* | 10/2012 | Liang et al. | 370/329 |
| 2014/0171093 A1* | 6/2014 | Stanwood et al. | 455/450 |

* cited by examiner

COMMUNICATION SYSTEMS AND METHODS IN A COMMUNICATION SYSTEM

CROSS-REFERENCE TO RELATED APPLICATIONS

This application is a 35 U.S.C §371 national stage application of PCT International Application No. PCT/SE2009/051419, filed on Nov. 24, 2011, the disclosure and content of which is incorporated by reference herein as if set forth in its entirety.

FIELD

The present disclosure relates a communication system and a method in a communication system. In particular, is herein described allocation of an amount of baseband resource in one of a plurality of digital units to a radio unit, serving a cell.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones, laptops with wireless capability. The user equipment units in the present context may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a network node, or base station e.g. a Radio Base Station (RBS), which in some networks may be referred to as "eNB", "eNodeB", "NodeB" or "B node", depending on the technology and terminology used. The network nodes may be of different classes such as e.g. macro eNodeB, home eNodeB or pico base station, based on transmission power and thereby also cell size. A cell is the geographical area where radio coverage is provided by the network node/base station at a base station site. One base station, situated on the base station site, may serve one or several cells. The network nodes communicate over the air interface operating on radio frequencies with the user equipment units within range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

In 3rd Generation Partnership Project (3GPP) Long Term Evolution (LTE), network nodes, or base stations, which may be referred to as eNodeBs or even eNBs, may be connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The 3GPP has undertaken to evolve further the UTRAN and GSM based radio access network technologies.

The 3GPP is responsible for the standardization of e.g. GSM, UMTS and LTE. LTE is a technology for realizing high-speed packet-based communication that may reach high data rates both in the downlink and in the uplink, and is thought of as a next generation mobile communication system relative UMTS.

In the present context, the expressions downlink, downstream link or forward link may be used for the transmission path from the network node to the user equipment. The expression uplink, upstream link or reverse link may be used for the transmission path in the opposite direction i.e. from the user equipment to the network node.

The load of a typical base station varies over time. Hence there is need for a high capacity during busy hours while the demand may be significantly lower during other periods. There may also be significant change of load in shorter time spans i.e. from one minute to another. However, some of the components comprised in the base station may utilize a significant amount of energy, even if there is little traffic load. A possible concept of reducing the energy consumption of the base station may be to shut down the base station when it is not used, or shut down parts of the base station when the traffic load is low. However, with known prior art base stations, it is not possible, or at least not convenient to easily shut down parts of a base station to save power and at the same time supply the user equipment with the same accessibility, i.e. maintained coverage and functions but reduced capacity in number of user equipment units.

Energy efficient processing is becoming more and more important in cellular communication systems. One trend is to centralise base band processing to large nodes in order to reduce in particular Operating Expenditures (OPEX). For example, in order to reduce the number of sites and thus removing site acquisition and labour work that is a substantial high capital investment cost in the deployment. On the operational expenditure side maintenance, energy and transmission related costs may be at least somewhat reduced and saved.

Another trend in the industry is to go towards a higher degree of integration. Traditionally base band processing has been closely connected to the antenna sites such as main remote type eNB with short distance between the main unit and the radio unit.

Current implementations of base stations are built in such a way that no trunking effects may be achieved. Base stations may only be hard allocated to a specific site that handles a limited number of cells. No advantage may thus be achieved by reallocation of hardware resources when traffic demands are moving from one area to another area. Load balancing may thus only be achieved for a limited amount of hardware resources. In a centralised radio access network where base band resources are located at a site serving a large number of radio units it is still not possible to pool all resources without some load balancing technology.

There may be a general desire to save energy consumption in a base station. There may be another general desire to simplify service, management and software update of base stations. Also, there may be a desire to reduce hardware utilisation and costs associated therewith.

SUMMARY

It is therefore an object to obviate at least some of the above mentioned disadvantages and to improve the performance in a communication system.

According to a first aspect, the object is achieved by a method in a communication system. The communication system comprises a plurality of digital units and a radio unit serving a cell. The method aims at allocating an amount of baseband resource in one of the plurality of digital units to the radio unit. The method comprises estimating the amount of the baseband resource to be allocated to the radio unit. Further, the method comprises identifying a digital unit of the plurality of digital units on which a neighbour radio unit, serving a neighbour cell, situated in a geographical vicinity of the cell is allocated baseband resource. In addition the method further comprises determining that the digital unit has available baseband resource of the estimated amount. If so the method also comprises allocating the estimated amount of baseband resource in the digital unit to the radio unit serving the cell.

According to a second aspect, the object is achieved by a communication system. The communication system comprises a plurality of digital units and a radio unit serving a cell. The communication system aims at allocating an amount of baseband resource in one of the plurality of digital units to the radio unit. The communication system further comprises a processing circuitry, configured to estimate the amount of baseband resource to be allocated to the radio unit. Also, the processing circuitry in addition is configured to identify a digital unit of the plurality of digital units on which a neighbour radio unit, serving a neighbour cell, situated in a geographical vicinity of the cell, is allocated baseband resource. Additionally, the processing circuitry further is also configured to determine that the digital unit has available baseband resource of the estimated amount. In further addition, the processing circuitry is configured to allocate the estimated amount of baseband resource in the digital unit to the radio unit serving the cell.

Thereby, thanks to embodiments of the present methods, communication systems and entities comprised therein, the physical division of the radio head and the computational processing of a base station, in a digital unit, is enabled. It is thereby possible to concentrate the computational processing for a number of radio units to some centrally situated digital units, which brings several advantages. Among other things, it is possible to close down at least some digital units during low load traffic or for maintenance reasons by means of blocking digital units, while still being able to provide coverage and service, possible with reduced performance, for any user equipment within any cell. Thereby energy may be saved making it possible to reduce energy costs, to reduce cost of batteries in solar powered systems by reducing power need during the night, and/or to increase the operation time on back up batteries. Further, it is possible to perform maintenance and software updates at the closed down digital units. Further, maintenance of the digital units also benefit from the fact that less travelling is required compared with having each digital unit distributed among the radio heads. Another advantage of concentrating the digital units is that security is enabled, as the concentration of digital units may be physically protected and kept under surveillance in a comprehensive manner. In addition, thanks to the present methods and communication system, the communication system becomes less vulnerable to malfunctions of a singular digital unit, as the broadband resources allocated on that digital unit may be reallocated to other, functioning digital units, whereby a high service level may be provided, also when a digital unit is down.

Other objects, advantages and novel features will become apparent from the following detailed description of the present method and communication system.

BRIEF DESCRIPTION OF THE DRAWINGS

The methods and communication systems are described in more detail with reference to attached drawings illustrating some examples of embodiments in which.

DETAILED DESCRIPTION

Embodiments herein are defined as a communication system and a method in a communication system, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1:
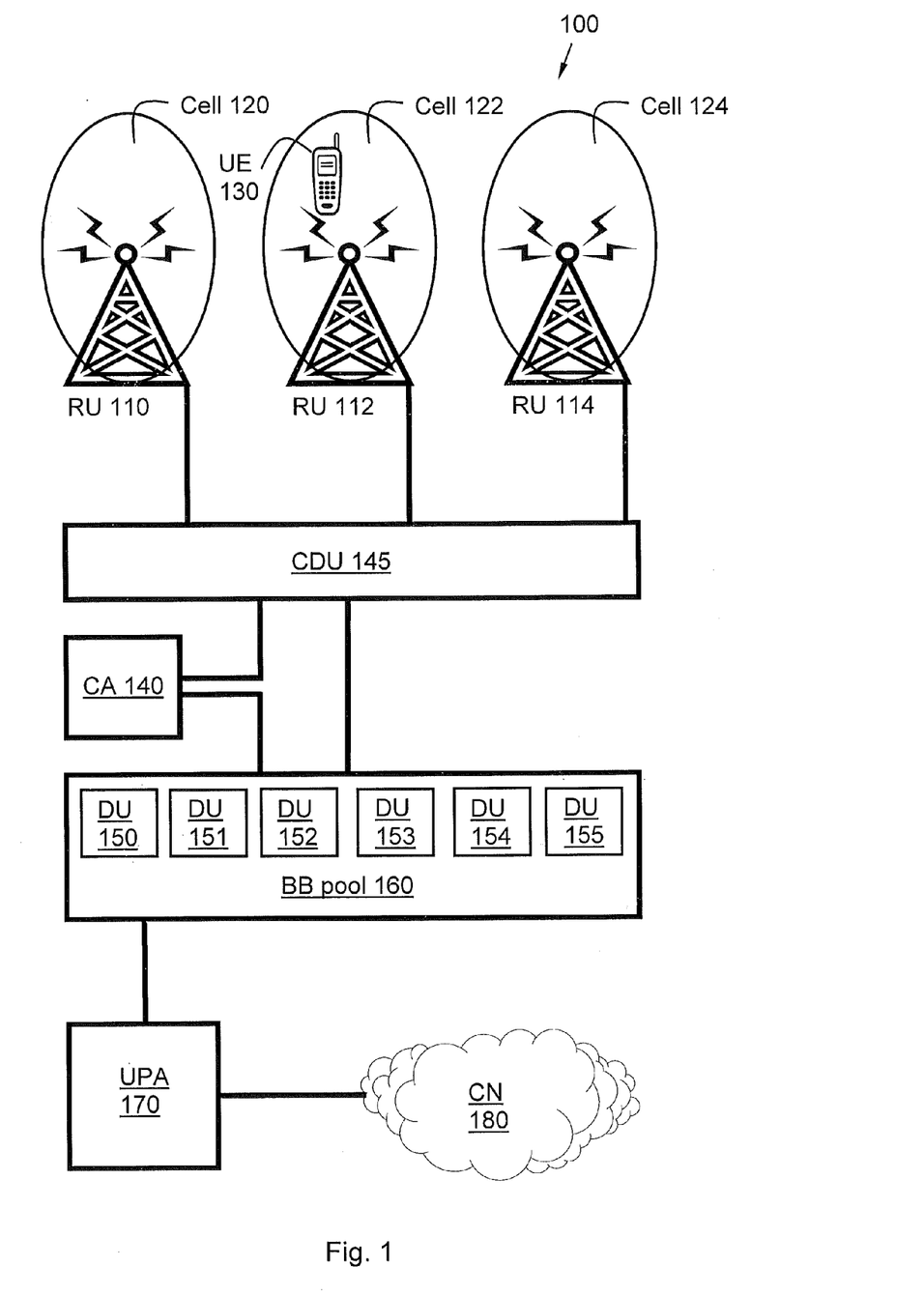
FIG. 1 is a schematic block diagram illustrating a communication system according to some embodiments.

FIG. 1 depicts a communication system 100. The communication system 100 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1x RTT and High Rate Packet Data (HRPD), just to mention some few options.

The communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 1 is to provide a simplified, general overview of the methods and devices herein described, and the functionalities involved. The methods and network nodes will herein, as a non-limiting example, be described in a 3GPP/LTE environment.

The communication system 100 comprises a first radio unit 110, a second radio unit 112 and a third radio unit 114. Each respective radio unit 110, 112, 114 is serving a first cell 120, a second cell 122 and a third cell 124, respectively. User equipment 130 may be situated within one of the cells 120, 122, 124, as illustrated in FIG. 1. The user equipment 130 and the radio units 110, 112, 114 are configured to communicate with each other. The radio units 110, 112, 114 may also be referred to as Radio Remote Units (RRU) in some terminology, and may comprise at least one radio antenna connected to the radio unit 110, 112, 114. Each site may serve several sectors/cells 120, 122, 124. Several radio units 110, 112, 114 may serve the same user equipment 130 and may thus be seen, or utilised as a cooperative radio, according to some embodiments.

The user equipment 130 is in the illustrated example situated in the second cell 122, served by the second radio unit 112. However, the user equipment 130 may move and enter another cell 120, 124, served by another radio unit 110, 114. The user equipment 130 is configured to transmit radio signals comprising information to be received by the radio unit 110, 112, 114. Further, the user equipment 130 is configured to receive radio signals comprising information transmitted by the radio unit 110, 112, 114.

The user equipment 130 may be represented by e.g. a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the radio unit 110, 112, 114.

It is to be noted that the illustrated network setting of radio units 110, 112, 114 and user equipment 130 in FIG. 1 is to be regarded as a non-limiting example of an embodiment only. The communication network 100 may comprise any other number and/or combination of radio units 110, 112, 114 configured to serve and communicate with any number of user equipment units 130, although only one instance of a user equipment 130 and three instances of radio units 110, 112, 114, respectively, are illustrated in FIG. 1 for clarity reasons. A plurality of radio units 110, 112, 114 and/or user equipment units 130 may further be involved in the present methods according to some embodiments.

Thus whenever "one" or "a/an" radio unit 110, 112, 114 and/or user equipment 130 is referred to in the present context, a plurality of radio units 110, 112, 114 and/or user equipment units 130 may be involved, according to some embodiments.

Further, the radio units 110, 112, 114 may be connected by a communication interface, such as e.g. Common Public Radio Interface (CPRI) connections, via a Cell Distribution Unit (CDU) 145, and by means of a Cell Allocator (CA) 140 to Digital Units (DU) 150, 151, 152, 153, 154, 155 in some embodiments. The communication interface connecting the enumerated entities may comprise a wired and/or a wireless connection, according to different embodiments. The digital units 150, 151, 152, 153, 154, 155 may be comprised in a Base Band pool (BB pool) 160. The digital units 150, 151, 152, 153, 154, 155 in the base band pool 160 are also configured to communicate with a Core Node (CN) 180 via a User Plane Aggregator (UPA) 170. Clusters of radio units 110, 112, 114 may thus be connected to one or more base band pools 160, or digital units 150, 151, 152, 153, 154, 155 in the base band pool 160. Thereby, time or frequency domain In-phase data stream and quadrature data stream (I/Q) data streams and control signals between digital units 150, 151, 152, 153, 154, 155 and radio units 110, 112, 114 may be communicated according to some embodiments.

It may here be mentioned that the above discussed entities illustrated in FIG. 1; cell distribution unit 145, cell allocator and user plane aggregator 170 comprised in the communication system 100 may be regarded as separate logical entities but not with necessity separate physical entities.

The digital units 150, 151, 152, 153, 154, 155 may according to some embodiments comprise, or be represented by e.g. an evolved Node B (eNB, or eNode B), a NodeB, a base station, a base transceiver station, depending e.g. of the radio access technology and terminology used.

The digital unit 150, 151, 152, 153, 154, 155 and/or base band pool 160 that performs the base station processing may be based on downlink and uplink requirements. The base band pool 160 and/or digital units 150, 151, 152, 153, 154, 155 may further comprise processing capabilities for Layer 1, Layer 2, Layer 3 and control processing according to some embodiments performed in a 3GPP environment. The digital units 150, 151, 152, 153, 154, 155 may be configured for communication within the network and with each other.

The cell distribution unit 145 may function as a switch in some embodiments, connecting a certain radio unit 110, 112, 114 with the allocated resource on the corresponding digital unit 150, 151, 152, 153, 154, 155. The cell allocator 140 may function as a load balancer, calculating and deciding how to balance load, and may direct the I/Q streams onto the digital unit 150, 151, 152, 153, 154, 155 in the base band pool 160.

The purpose and functionality of the cell allocator 140 may be to allocate resources on a digital unit 150, 151, 152, 153, 154, 155 for a radio unit 110, 112, 114. The user plane aggregator 170 may have the purpose of keeping track on where, i.e. on which digital unit 150, 151, 152, 153, 154, 155 a certain radio unit 110, 112, 114 and/or the cell 120, 122, 124 served by the respective radio unit 110, 112, 114 has been allocated resources when signalling to be received by the radio unit 110, 112, 114 and/or cell 120, 122, 124 is received from the core network 180. However, the functionality of the cell allocator 140 and the user plane aggregator 170 respectively may be performed within another entity within the communication system 100 according to some embodiments.

The herein described method to use a load balancer, or cell allocator 140 to allocate resources to dynamic cluster of remote cooperative radio units 110, 112, 114 may be deployed in combination with an instant pooling functionality executing within the base band pool 160, according to some embodiments.

Pooling capabilities may be divided into two levels according to some embodiments, one that handles the slow varying changes in the network related to processing demands. The second part of the pooling capabilities handles the short term changes in traffic demand mainly handled by the scheduler that owns the base band processing resources, the combination of the load balancing and instant pooling capabilities defines the base band pool 160.

The cell allocator 140 may balance and distribute the load on the digital units 150, 151, 152, 153, 154, 155 and operate on a medium to long term basis. Some main functionality may be to allocate radio units 110, 112, 114 or cells 120, 122, 124 onto hardware based on knowledge about the topology of the radio access network by means of measurements and/or a neighbour list of the radio units 110, 112, 114 or cells 120, 122, 124. Further, the cell allocator 140 may distribute cells 120, 122, 124 onto base band processing capabilities, such as resources on any digital unit 150, 151, 152, 153, 154, 155 and configure cells by means of bandwidth and antenna streams according to some embodiments. Thanks to the balancing and distribution made by the cell allocator 140, available resources may be utilised in an optimised or at least somewhat improved manner. Further, the cell allocator 140 may manage the cell distribution to allocated resources.

The cell allocator 140 may continuously supervise the network performance by measurements of traffic and utilisation of hardware resources according to some embodiments. Such measurements may be performed on traffic parameter metrics such as e.g. class/category/capability of user equipment 130, density/sub-areas of user equipment 130, traffic volume and/or Quality of Service (QoS) distribution. Some examples of hardware resources metrics may be memory utilization, processor load and/or antenna ports.

Optimisation performed on utilisation of hardware resources may comprise communication interface such as e.g. CPRI links, L1, and L2 processing capabilities and/or memory utilisation, according to some embodiments.

The instant pooling is a functionality that operates on short term basis. The instant pooling may comprise a combined air interface and board hardware scheduler that allows for hardware resource and communication interface port sharing according to some embodiments. Further, the instant pooling may improve, or optimize hardware resource utilisation and system performance based on instantaneous cell load.

The digital unit 150, 151, 152, 153, 154, 155 in the base band pool 160 may be connected to radio units 110, 112, 114 by means of a switch, i.e. the cell distribution unit 145, which may be regarded as an I/Q flow switch. The cell distribution unit 145 may comprise a Dense-Wavelength-Division Multiplexing (DWDM) functionality. I/Q data streams may be transmitted, to/from the radio units 110, 112, 114, by means of CPRI over fibre in an embodiment. In some embodiments, the cell distribution unit 145, or DWDM, in uplink, may select logical I/Q data streams from radio units 110, 112, 114 that may be used as cooperative radio. The selected I/Q data streams may then be distributed to allocated base band pool 160, by means of the cell distribution unit 145.

Communication between digital units 150, 151, 152, 153, 154, 155 in the base band pool 160 may be performed by e.g. by means of an X2 interface, within a 3GPP LTE environment. Further an S1 interface may be handled by a Network Processor (NP). There may be one RRC processor, one L3 UP processor and one Load balancer for each base band pool 160, according to some embodiments within a 3GPP LTE environment. Instant pooling, that optimises the resource utilisation and performance, may be performed within the base band pool 160. It is to be noted that in another technical environment such as UMTS or GSM, other communication interfaces may be utilised. Some examples of other possible communication interfaces may be access stratum, Iu, Iub, Iur, M1, M2 and M3 protocols.

The cell allocator 140 controls the cell distribution unit 145, based on available network status, in order to distribute I/Q data streams between allocated hardware resources on the digital units 150, 151, 152, 153, 154, 155 and the radio units 110, 112, 114.

The cell allocator 140, or load balancer, may negotiate with surrounding cell allocators that are connected to the same fibres, over a communication interface such as e.g. X2+ interface, according to some embodiments. Such communication may comprise negotiations concerning which cell allocator is to handle a particular radio unit 110, 112, 114 due to e.g. power save, error, load balancing etc.

Load balancer functionality and switch is implemented by means of the cell distribution unit 145 and the cell allocator 140, respectively. The cell distribution unit 145 distributes the selected I/Q data streams to the digital units 150, 151, 152, 153, 154, 155. The base band pool 160 may be implemented by means of a number of digital units 150, 151, 152, 153, 154, 155. S1, X2, RRC, L3 UP and load balancer may execute on a General-Purpose Processor (GPP), according to some embodiments.

The digital units 150, 151, 152, 153, 154, 155 may be of type Application Specific Processor (ASP) or high performance GPP, or Digital-Signal-Processor (DSP) according to some embodiments. There may be several base band pools 160 within a communication system 100 according to some embodiments.

It may here be explained that most cellular systems, such as e.g. GSM, WCDMA and LTE use a terminology that divide their channels in two classes; common channels and dedicated channels.

The common channels for radio signals may be considered as defining a cell, e.g. in WCDMA and LTE, or a group of carriers e.g. in GSM. Some examples of common channels may comprise some kind of broadcasted signal indicating to the user equipment 130, that the cell exist and relevant information for accessing it. Another example may comprise some shared access means where any user equipment 130 may indicate that it wants a connection. Further, a paging channel, broadcasting information that a user equipment 130 has a connection such as a call, waiting and that it may connect itself.

Without the common channel, it is more or less impossible for a user equipment 130 to use the cell 122 since it may be "invisible" and there may be no way to start a connection to it.

The dedicated channel is dedicated to a single user equipment 130. Hence there are in general several dedicated channels available in a cell allowing a great number of user equipment 130 to be connected simultaneously. A dedicated connection may be made by requesting it from the common channel, when not connected. Alternatively, if the user equipment 130 already has a dedicated connection, it may negotiate, or determine, a transfer to another dedicated connection, typically a handover to another cell 120, 124.

In order to enhance system availability, a redundant system may be achieved by running two base band pools 160 in parallel by means of adding an optical splitter and duplicating the DWDM according to some embodiments.

Figure 2:
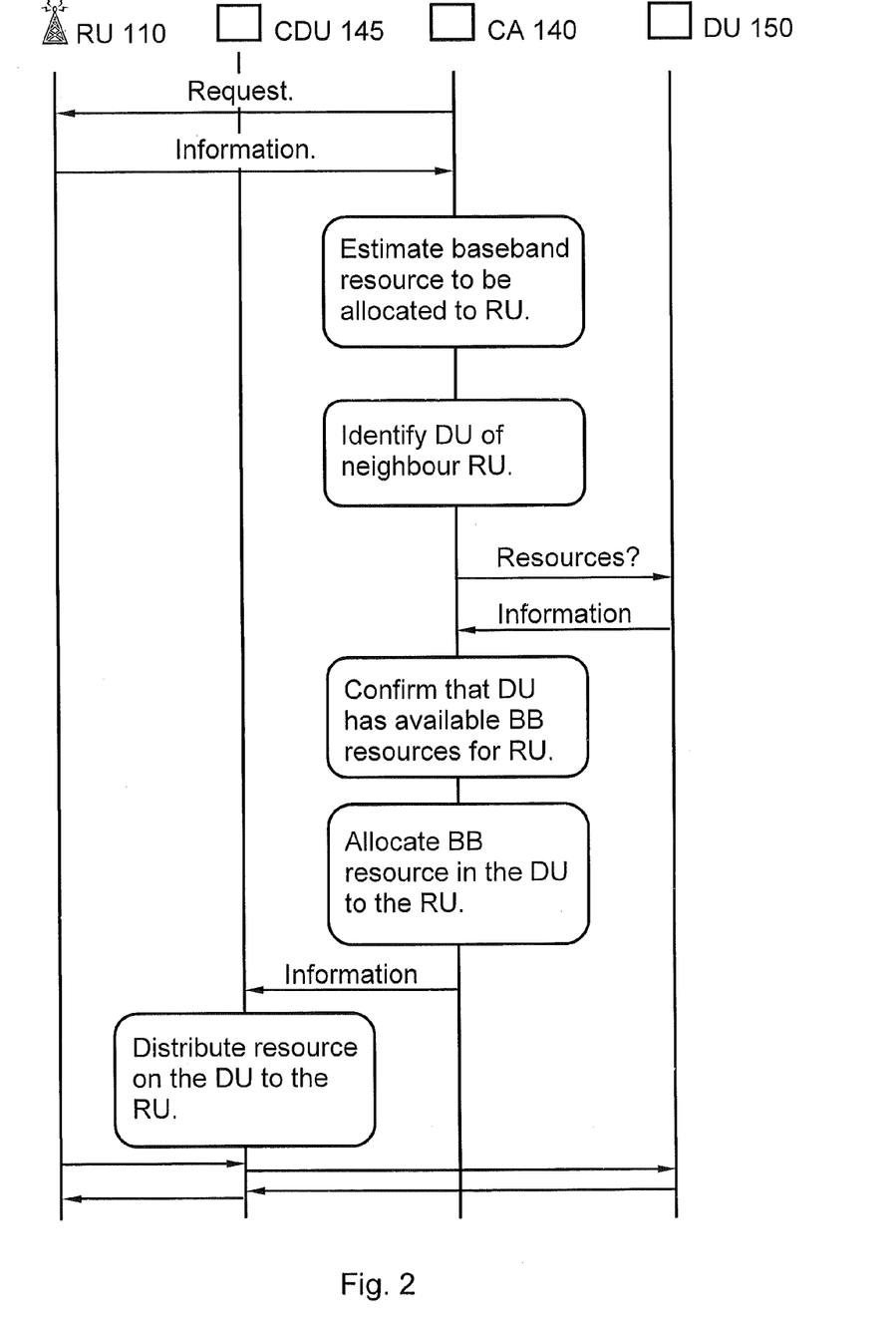
FIG. 2 is a combined signalling scheme and block diagram illustrating a communication system according to some embodiments.

FIG. 2 is a combined signalling scheme and block diagram, presenting a non-limiting example of a scenario wherein resources are allocated within the communication system 100, comprising a radio unit 110, a cell distribution unit 145, a cell allocator 140 and a digital unit 150.

The cell allocator 140 of the communication system 100 allocates resources on the digital unit 150 for the radio unit 110, which radio unit 110 is serving a cell 120. Initially, the cell allocator 140 may retrieve or request information from the radio unit 110, according to some embodiments, which information may comprise e.g. a request for an amount of resources on the digital unit 150. Based on any such information, the cell allocator 140 may estimate the amount of base band resources to be allocated to the radio unit 110.

Knowing that, the cell allocator 140 may identify the digital unit 150 among a plurality of digital units 150, 151, 152, 153, 154, 155 on which a neighbour radio unit 112, 114, serving a neighbour cell 122, 124, situated in a geographical vicinity of the cell 120 is allocated baseband resource.

Further, the cell allocator 140 may determine that the digital unit 150 has available baseband resource of the estimated amount, e.g. by requesting such information from the digital unit 150. If it could be determined that the digital unit 150 has the estimated amount of resources available, the cell allocator 140 may allocate the estimated amount of baseband resource in the digital unit 150 to the radio unit 110 serving the cell 120.

The cell allocator 140 may further inform the cell distribution unit 145 which baseband resource on the digital unit 150 that has been allocated to the radio unit 110. The cell distribution unit 145 may then function as a switch, distributing resources of the digital unit 150 to the radio unit 110.

Figure 3:
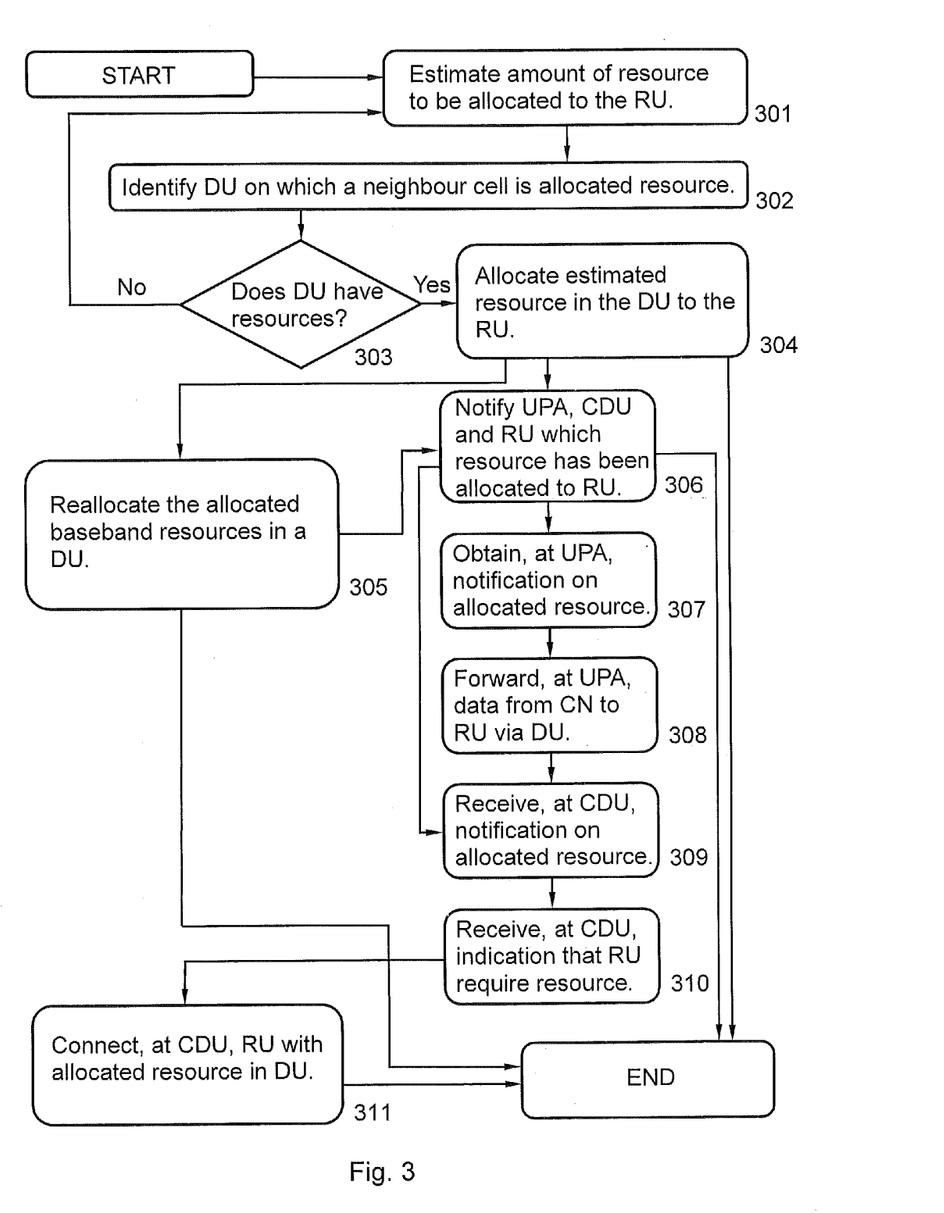
FIG. 3 is a flow chart illustrating a method in a communication system according to some embodiments.

FIG. 3 is illustrating some possible actions to be performed in a communication system 100 comprising a plurality of digital units 150, 151, 152, 153, 154, 155 and a radio unit 112 serving a cell 122, for allocating an amount of baseband resource in one of the plurality of digital units 150, 151, 152, 153, 154, 155 to the radio unit 112. The plurality of digital units 150, 151, 152, 153, 154, 155 may be referred to as a base band pool 160. The actions may be performed e.g. in a cell allocator 140, comprised in the communication system 100 according to some embodiments. However, according to some embodiments, the method may be performed in another entity comprised in the communication system 100.

The communication system 100 may according to some embodiments comprise a user plane aggregator 170, configured to keep track on where, within the plurality of digital units 150, 151, 152, 153, 154, 155, the radio unit 112, which is serving the cell 122 is allocated baseband resource, and a cell distribution unit 145, configured to connect the radio unit 112 serving the cell 122 with the allocated baseband resource in the digital unit 150, 151, 152, 153, 154, 155 upon request.

It may be noted that not all actions 301-311 may be performed within all embodiments of the method, and that the order of performance in time may be different from the order of enumeration. Further, some of the actions may be performed simultaneously, according to some embodiments.

Action 301

The amount of the baseband resource to be allocated to the radio unit 112 is estimated.

The estimation of the amount of baseband resource to be allocated to the radio unit 112 may be based on at least one parameter related to resource utilisation in the cell 122 served by the radio unit 112, according to some embodiments.

The parameter, related to resource utilisation in the cell 122, served by the radio unit 112 may be based on any, or a combination of: collected statistical baseband resource utilisation, number of user equipment 130 in the cell 122, number of user equipment 130 of different capacity categories in the cell 122, the traffic load within the cell 122 served by the radio unit 112, the time of the day, the day of the week, the season of the year, band width of the radio unit 112, number of antennas related to the radio unit 112, according to different embodiments.

Thereby for example, statistical information concerning historical usage within the cell 122 at different times may form a base for such estimation of the expected load within the cell 122. Further, the number of user equipment 130 within the cell, and/or the number of user equipment 130 with different capabilities may be counted and form base for an estimation of the expected load within the cell 122. For example, user equipment 130 with high capability, configured for internet surfing may be expected to transmit and receive more data than user equipment 130 configured for voice communication.

However, according to some embodiments, the estimation of the baseband resource alternatively or in addition comprises predicting the future requirement of baseband resource within a future period of time, further based on information related to future resource utilisation in the cell 122, served by the radio unit 112.

The information related to future resource utilisation in the cell 122, served by the radio unit 112 may be based on any, or a combination of: the number of user equipment 130 in neighbour cells 120, 124 moving towards the cell 122, information concerning the number of user equipment 130 moving in direction from the centre of the cell 122 towards the edge of the cell 122, statistical variations over time of resource utilisation within the cell 122, according to different embodiments.

Thereby, according to those embodiments, the movements of user equipment 130 expected to enter and leave the cell 122, respectively may be used as a base for estimating the load/ future load of the cell 122 and for estimating the amount of baseband resource to be allocated to the radio unit 112.

Further, according to some embodiments, the amount of baseband resource to be allocated to the radio unit 112 may be reduced in size in comparison with requirements of the radio unit 112, based on the load of the cell 122 and/or predicted future load of the cell 122. Thus the radio unit 112 may be allocated less resource than the estimation indicates that is required, leading to saving of baseband resources within the digital unit 150, 151, 152, 153, 154, 155. Thereby, according to some embodiments, the basebands requirements of the radio unit 112, as estimated may be reduced. Such reduction may comprise reducing the RU served bandwidth and/or antennas, such as e.g. less number of separate dirigible antenna.

It may further be mentioned that this action 301 may be performed continuously according to some embodiments. Further, according to some embodiments, the amount of the baseband resource to be allocated to the radio unit 112 may be estimated triggered by any of the reallocation of another radio unit 110, 114, addition of a radio unit 110, 114, and/or changes in traffic in the cell 120, 122, 124 of the radio unit 112.

Action 302

One digital unit 150, 151, 152, 153, 154, 155 of the plurality of digital units is identified, on which a neighbour radio unit 110, 114, serving a neighbour cell 120, 124, situated in a geographical vicinity of the cell 122 is allocated baseband resource.

In case a plurality of digital units 150, 151, 152, 153, 154, 155 may be identified, on which different neighbour radio units 110, 114 are allocated baseband resources, the digital unit 150, 151, 152, 153, 154, 155 on which most of the neighbour radio units 110, 114 are allocated baseband resources may be identified according to some embodiments.

However, the identification may comprise acquiring a neighbour cell list associated with the cell 122, according to some embodiments.

The neighbour cell list may be acquired from the user equipment 130, which may measure signals, such as reference signals, transmitted from different radio units 110, 112, 114 and reporting them to the serving radio unit 112, if configured or requested to do so. Such neighbour cell list thus may comprise an indication, or code, making it possible to identify the neighbour radio units 110, 114.

However, the neighbour radio units 110, 114 of the radio unit 112 may be acquired in several other manners, for example by sending a request to a look-up service or the like. Such list of neighbour radio units 110, 114 to the radio unit 112 may further be coded and stored in a register within the communication system 100 according to some embodiments. Such list may be updated at intervals, or when new radio units 110, 112, 114 are deployed in the geographical vicinity.

Action 303

It is determined that the digital unit 150, 151, 152, 153, 154, 155 has baseband resource of the estimated 301 amount available.

Such determination of available baseband resource at the digital unit 150, 151, 152, 153, 154, 155 may be made by obtaining, such as requesting the capacity concerning the available baseband resource at the digital unit 150, 151, 152, 153, 154, 155 according to some embodiments.

Action 304

This action may be performed within some embodiments, for which it has been determined 303 that the digital unit 150, 151, 152, 153, 154, 155 has the estimated 301 amount of baseband resource available.

The estimated 301 amount of baseband resource in the digital unit 150, 151, 152, 153, 154, 155 may be allocated to the radio unit 112 serving the cell 122.

Action 305

This action may be performed within some alternative embodiments.

The baseband resource allocated to an isolated radio unit may be reallocated to another digital unit 150, 151, 152, 153, 154, 155, in case an isolated radio unit with allocated baseband resource on one of the plurality of digital units 150, 151, 152, 153, 154, 155 has been detected and no baseband resource being allocated to any neighbour radio unit of the isolated radio unit, according to some embodiments.

Thereby, any, some or all of the digital units 150, 151, 152, 153, 154, 155 may be searched, for baseband resources allocated to an isolated radio unit. If possible, after having detected baseband resources allocated to such isolated radio unit, an attempt may be made to re-allocate the detected baseband resources to a digital unit 150, 151, 152, 153, 154, 155 on which any neighbour radio unit has been allocated base band resources. Thereby, baseband resources allocated to neighbour radio units may be collected and kept together.

However, according to some embodiments, the allocated baseband resources may be reallocated in any of the plurality of digital units 150, 151, 152, 153, 154, 155 by determining the amount of allocated baseband resources in a first digital unit 150 of the plurality of digital units 150, 151, 152, 153, 154, 155, determining the amount of non-allocated baseband resources in a second digital unit 151 of the plurality of digital units 150, 151, 152, 153, 154, 155, detecting that the first digital unit 150 has a determined amount of allocated baseband resources which is equal to, or smaller than the determined amount of non-allocated baseband resources of the second digital unit 151, and reallocating baseband resource of the first digital unit 150 to the second digital unit 151.

It may thereby be possible e.g. in periods of low traffic load within the cells 120, 122, 124, to redistribute the allocated baseband resources to fewer digital units 150, 151, 152, 153, 154, 155, making it possible to turn down any or some of the digital units 150, 151, 152, 153, 154, 155 in the base band pool 160, which saves energy resources, and also enable e.g. software update and other maintenance of the digital units 150, 151, 152, 153, 154, 155 according to some embodiments.

However, it may be mentioned that, according to some embodiments, it may be discovered that the baseband resources allocated for the radio unit 112 is insufficient, while there is no free baseband resources on the digital unit 150, 151, 152, 153, 154, 155. Then, in such case, some other radio units 110, 114 which are allocated on the same digital unit 150, 151, 152, 153, 154, 155 as the radio unit 112, may be reallocated to another digital unit 150, 151, 152, 153, 154, 155, in order to get more baseband resource available, that may be allocated to the radio unit 112. However, according to some further embodiments, the base band pool 160 may be expanded by yet a digital unit 150, 151, 152, 153, 154, 155, in order to get more baseband resources available for the radio units 110, 112, 114.

Action 306

This action may be comprised within some alternative embodiments, wherein the communication system 100 comprises a user plane aggregator 170, configured to keep track on where, within the plurality of digital units 150, 151, 152, 153, 154, 155, the radio unit 112, which is serving the cell 122 is allocated baseband resource, and a cell distribution unit 145, configured to connect the radio unit 112 serving the cell 122 with the allocated baseband resource in the digital unit 150, 151, 152, 153, 154, 155 upon request, but not necessarily within all embodiments of the method.

The cell distribution unit 145 and the user plane aggregator 170 which baseband resource has been allocated 304 to the radio unit 112 serving the cell 122 may be notified. further, according to some embodiments, the radio unit 112 may be notified which baseband resource it has been allocated.

Action 307

This action may be comprised within some alternative embodiments, but not necessarily within all embodiments of the method.

A notification concerning which baseband resource has been allocated to the radio unit 112 serving the cell 122 may be obtained at the user plane aggregator 170. Further, the notification may comprise information concerning which digital unit 150, 151, 152, 153, 154, 155 the baseband resource allocated to the radio unit 112 is situated on.

Such notification may be received from the cell allocator 140 according to some embodiments, or from another entity comprised within the communication system 100 performing load balancing of base band resources between the digital units 150, 151, 152, 153, 154, 155.

Action 308

This action may be comprised within some alternative embodiments, but not necessarily within all embodiments of the method.

Data from a core network 180 intended to be received by the radio unit 112 serving the cell 122, may be forwarded at the user plane aggregator 170 to the digital unit 150, 151, 152, 153, 154, 155 on which the radio unit 112 has been allocated the baseband resource according to some embodiments.

Thus the user plane aggregator 170 may keep track of where, i.e. on which digital unit 150, 151, 152, 153, 154, 155 any radio unit 110, 112, 114 is allocated baseband resources, and may forward data received from the core network 180 to the appropriate digital unit 150, 151, 152, 153, 154, 155.

Action 309

This action may be comprised within some alternative embodiments, but not necessarily within all embodiments of the method.

A notification concerning which baseband resource has been allocated to the radio unit 112 serving the cell 122, may be received at the cell distribution unit 145 according to some embodiments. Further, the notification may comprise information concerning which digital unit 150, 151, 152, 153, 154, 155 the baseband resource allocated to the radio unit 112 is situated on.

Any such notification may be received from the cell allocator 140 according to some embodiments, or from another entity comprised within the communication system 100 performing load balancing of base band resources between the digital units 150, 151, 152, 153, 154, 155.

Thus the cell distribution unit 145 may keep track of where, i.e. on which digital unit 150, 151, 152, 153, 154, 155 any radio unit 110, 112, 114 is allocated base band resources, according to some embodiments.

Action 310

This action may be comprised within some alternative embodiments, but not necessarily within all embodiments of the method.

An indication, indicating that the radio unit 112 requires baseband resource may be received at the cell distribution unit 145, according to some embodiments.

Such indication may be explicitly signalled by the radio unit 112 and/or by the cell allocator 140, or alternatively be implicitly determined.

Action 311

This action may be comprised within some alternative embodiments, but not necessarily within all embodiments of the method.

The radio unit 112 requiring the baseband resource may be connected at the cell distribution unit 145 with the allocated baseband resource in the digital unit 150, 151, 152, 153, 154, 155, according to some embodiments.

The actions 301-311 to be performed in the communication system 100 may be implemented through one or more processing circuitry according to some embodiments, together with computer program code for performing the functions of at least some of the disclosed actions 301-311. Thus a computer program product, comprising instructions for performing the actions 301-311 may allocate an amount of baseband resource in one of the plurality of digital units 150, 151, 152, 153, 154', 155 to the radio unit 112, when being loaded into the one or more processing circuitry comprised within one or more entities within the communication system 100.

The computer program product mentioned above may be provided for instance in the form of a data carrier carrying computer program code for performing at least some of the actions 301-311 according to some embodiments when being loaded into the processing circuitry. The data carrier may be e.g. a hard disk, a CD ROM disc, a DVD disc, a memory stick, an optical storage device, a magnetic storage device or any other appropriate medium such as a disk or tape that may hold machine readable data in a non-transitory manner. The computer program product may furthermore be provided as computer program code on a server and downloaded to the processing circuitry in the communication system, e.g. over an Internet or an intranet connection.

Figure 4:
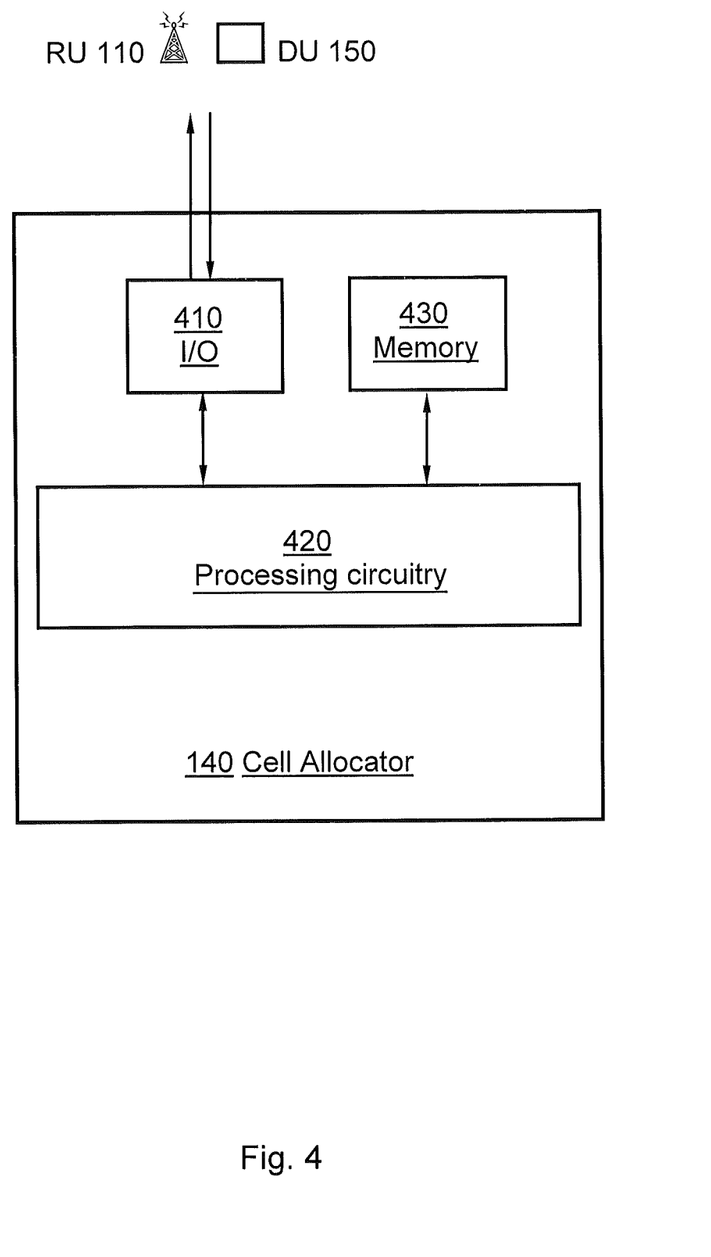
FIG. 4 is a schematic block diagram illustrating a cell allocator according to some embodiments.

FIG. 4 is a block diagram illustrating a cell allocator 140, comprised in a communication system 100. The communication system 100 further comprises a plurality of digital units 150, 151, 152, 153, 154, 155 and a radio unit 112 serving a cell 122. The communication system 100 is configured for allocating an amount of baseband resource in one of the plurality of digital units 150, 151, 152, 153, 154, 155 to the radio unit 112.

For the sake of clarity, any internal electronics or other components of the cell allocator 140, not completely needed for understanding the present method has been omitted from FIG. 4.

In order to perform any, some or all of the actions 301-311 correctly, the cell allocator 140 in the communication system 100 comprises a processing circuitry 420, configured to estimate the amount of baseband resource to be allocated to the radio unit 112. The processing circuitry 420 is also configured to identify a digital unit 150, 151, 152, 153, 154, 155 of the plurality of digital units on which a neighbour radio unit 110, 114, serving a neighbour cell 120, 124, situated in a geographical vicinity of the cell 122 is allocated baseband resource. In addition, the processing circuitry 420 is further configured to determine that the digital unit 150, 151, 152, 153, 154, 155 has available baseband resource of the estimated amount. Additionally, the processing circuitry 420 is also configured to allocate the estimated amount of baseband resource in the digital unit 150, 151, 152, 153, 154, 155 to the radio unit 112 serving the cell 122.

The processing circuitry 420 may be further configured to estimate the amount of baseband resource to be allocated to the radio unit 112, based on at least one parameter related to resource utilisation in the cell 122 served by the radio unit 112, according to some embodiments.

Such parameter, related to resource utilisation in the cell 122, served by the radio unit 112 may be based on any, or a combination of: collected statistical baseband resource utilisation, number of user equipment 130 in the cell 122, number of user equipment 130 of different capacity categories in the cell 122, the traffic load within the cell 122 served by the radio unit 112, the time of the day, the day of the week, the season of the year, bandwidth of the radio unit 112, number of antennas related to the radio unit 112, according to some embodiments.

Further, according to some embodiments, the processing circuitry 420 may further be configured to estimate the amount of baseband resource by predicting the future requirement of baseband resource within a future period of time. Such prediction may be based on information related to future baseband resource utilisation in the cell 122 served by the radio unit 112.

The information related to future baseband resource utilisation in the cell 122, served by the radio unit 112 may be based on any, or a combination of: the number of user equipment 130 in neighbour cells 120, 124 moving towards the cell 122, information concerning the number of user equipment 130 moving in direction from the centre of the cell 122 towards the edge of the cell 122, statistical variations over time of baseband resource utilisation within the cell 122, according to some embodiments.

The processing circuitry 420 may be further configured to reduce size of the amount of baseband resource to be allocated to the radio unit 112, in comparison with requirements of the radio unit 112, based on the load of the cell 122 and/or predicted future load of the cell 122.

The processing circuitry 420, may be further configured according to some embodiments, to identify the digital unit 150, 151, 152, 153, 154, 155 on which most of the neighbour radio units 110, 114 are allocated baseband resources.

The processing circuitry 420, may be further configured to acquire a neighbour cell list associated with the cell 122 in order to identify the digital unit 150, 151, 152, 153, 154, 155 on which the neighbour radio unit 110, 114, serving the neighbour cell 120, 124 is allocated baseband resource.

Further, the processing circuitry 420, may according to some embodiments be further configured to detect an isolated radio unit with allocated baseband resource on one of the plurality of digital units 150, 151, 152, 153, 154, 155 and no baseband resources being allocated to any neighbour radio unit of the isolated radio unit. In addition, the processing circuitry 420, may also be configured to reallocate the baseband resource allocated to the isolated radio unit to another digital unit 150, 151, 152, 153, 154, 155.

In further addition, the processing circuitry 420, may also be configured to determine the amount of allocated baseband resources in any of the plurality of digital units 150, 151, 152, 153, 154, 155. Further, the processing circuitry 420, may be configured to determine the amount of non-allocated baseband resources in any of the plurality of digital units 150, 151, 152, 153, 154, 155. Also, the processing circuitry 420, may also be configured to detect a first digital unit 150 having a determined amount of allocated baseband resources which are equal to, or smaller than the determined amount of non-allocated baseband resources of a second digital unit 151. Additionally, the processing circuitry 420 may also in addition be configured to reallocate baseband resource of the first digital unit 150 to the second digital unit 151, according to some embodiments.

According to some embodiments, wherein the communication system 100 further comprises a user plane aggregator 170 and a cell distribution unit 145, the processing circuitry 420, may be further configured to notify the cell distribution unit 145 and the user plane aggregator 170 which baseband resource has been allocated to the radio unit 112 serving the cell 122, according to such embodiments.

The processing circuitry 420 may comprise e.g. one or more instances of a Central Processing Unit (CPU), a processing unit, a processor, a microprocessor, or other processing logic that may interpret and execute instructions. The processing circuitry 420 may further perform data processing functions for inputting, outputting, and processing of data comprising data buffering and device control functions, such as processing control, user interface control, or the like.

The processing circuit 420 may comprise a combination of digital signal processors and dedicated signal processing chips used to control the functionalities for distributing and allocating an amount of baseband resource in one of the plurality of digital units 150, 151, 152, 153, 154, 155 to the radio unit 112.

Further, according to some embodiments, the cell allocator 140 may comprise at least one memory 430. The memory 430 may comprise a physical device utilized to store data or programs i.e. sequences of instructions, on a temporary or permanent basis. According to some embodiments, the memory 430 may comprise integrated circuits comprising silicon-based transistors. Further, the memory 430 may be volatile or non-volatile according to different embodiments.

Further, according to some embodiments, the cell allocator 140 may comprise an input/output (I/O) interface 410, configured to communicate with other entities comprised in the communication system 100, according to some embodiments. For example, the input/output (I/O) interface 410 may be configured to communicate with any radio unit 110, 112, 114 and/or any digital unit 150, 152, 154.

Further, it is to be noted that some of the described units 410, 430, 420 comprised within the cell allocator 140 in the communication system 100 may be regarded as separate logical entities but not with necessity separate physical entities.

Figure 5:
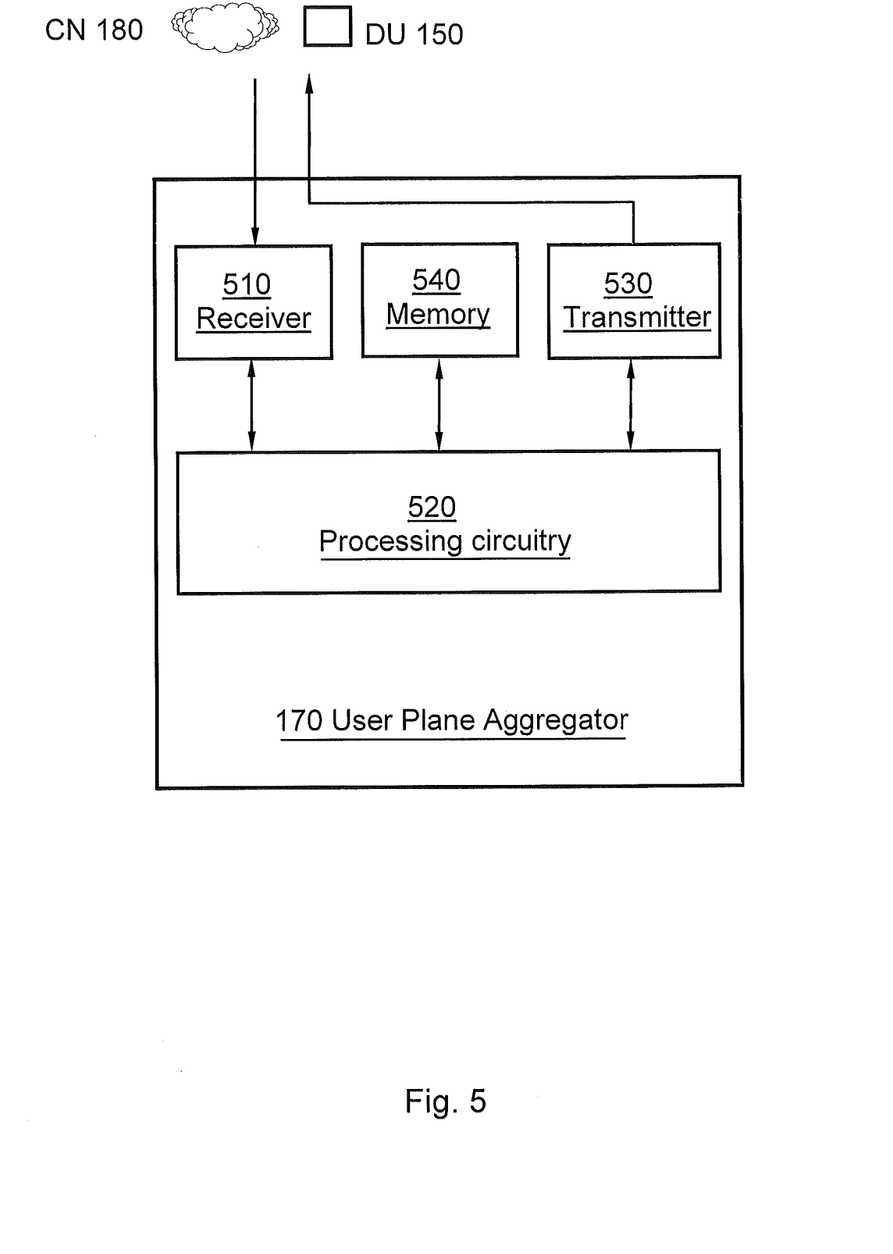
FIG. 5 is a block diagram illustrating a user plane aggregator according to some embodiments.

FIG. 5 is a block diagram illustrating a user plane aggregator 170, which may be comprised in the communication system 100 according to some embodiments.

For the sake of clarity, any internal electronics or other components of the user plane aggregator 170, not completely needed for understanding the present method has been omitted from FIG. 5.

The user plane aggregator 170 may according to some embodiments comprise a processing circuitry 520. The processing circuitry 520 may be configured to keep track on where, within the plurality of digital units 150, 151, 152, 153, 154, 155, the radio unit 112, which is serving the cell 122 is allocated baseband resource.

In further addition, the processing circuitry 520 comprised in the user plane aggregator 170 may be configured to connect the radio unit 112 serving the cell 122 with the allocated baseband resource in the digital unit 150, 151, 152, 153, 154, 155 upon request.

The processing circuitry 520 may comprise e.g. one or more instances of a Central Processing Unit (CPU), a processing unit, a processor, a microprocessor, or other processing logic that may interpret and execute instructions. The processing circuitry 520 may further perform data processing functions for inputting, outputting, and processing of data comprising data buffering and device control functions, such as call processing control, user interface control, or the like.

According to some embodiments, the user plane aggregator 170 may comprise at least one memory 540. The memory 540 may comprise a physical device utilized to store data or programs i.e. sequences of instructions, on a temporary or permanent basis. According to some embodiments, the memory 540 may comprise integrated circuits comprising silicon-based transistors. Further, the memory 540 may be volatile or non-volatile. The user plane aggregator 170 may further according to some embodiments comprise at least one volatile memory 540 and also at least one non-volatile memory 540.

The user plane aggregator 170 may comprise a receiver 510, configured to receive a notification from the cell allocator 140, or from the another entity within the communication system 100, concerning which baseband resource has been allocated to the radio unit 112 serving the cell 122.

Also, the user plane aggregator 170 further may comprise a transmitter 530 configured to forward data from a core network 180, intended to be received by the radio unit 112 serving the cell 122, to the digital unit 150, 151, 152, 153, 154, 155 on which the radio unit 112 has been allocated the baseband resource.

It may be mentioned that the receiver 510 and the transmitter 530 may be configured for wired or wireless communication with other entities within the communication system 100, according to different embodiments. Thereby, thanks to the respective functionalities of the receiver 510 and the transmitter 530, the user plane aggregator 170 may distribute messages, data or information from the core network 180, to the intended recipient, i.e. to the digital unit 150, 151, 152, 153, 154, 155 on which the radio unit 112 has been allocated the baseband resource, in case the radio unit 112 is the intended recipient.

The user plane aggregator 170 is further configured to communicate in the other way, to forward data from the radio unit 112 and/or the digital unit 150, 151, 152, 153, 154, 155 on which the radio unit 112 has been allocated the baseband resource, to the core network 180. Thereby, all data forwarded to the core network 180 may be sent having the same IP address.

Further, it is to be noted that some of the described units 510, 520, 530 and 540 comprised according to different embodiments within the user plane aggregator 170 in the communication system 100 may be regarded as separate logical entities but not with necessity separate physical entities.

Figure 6:
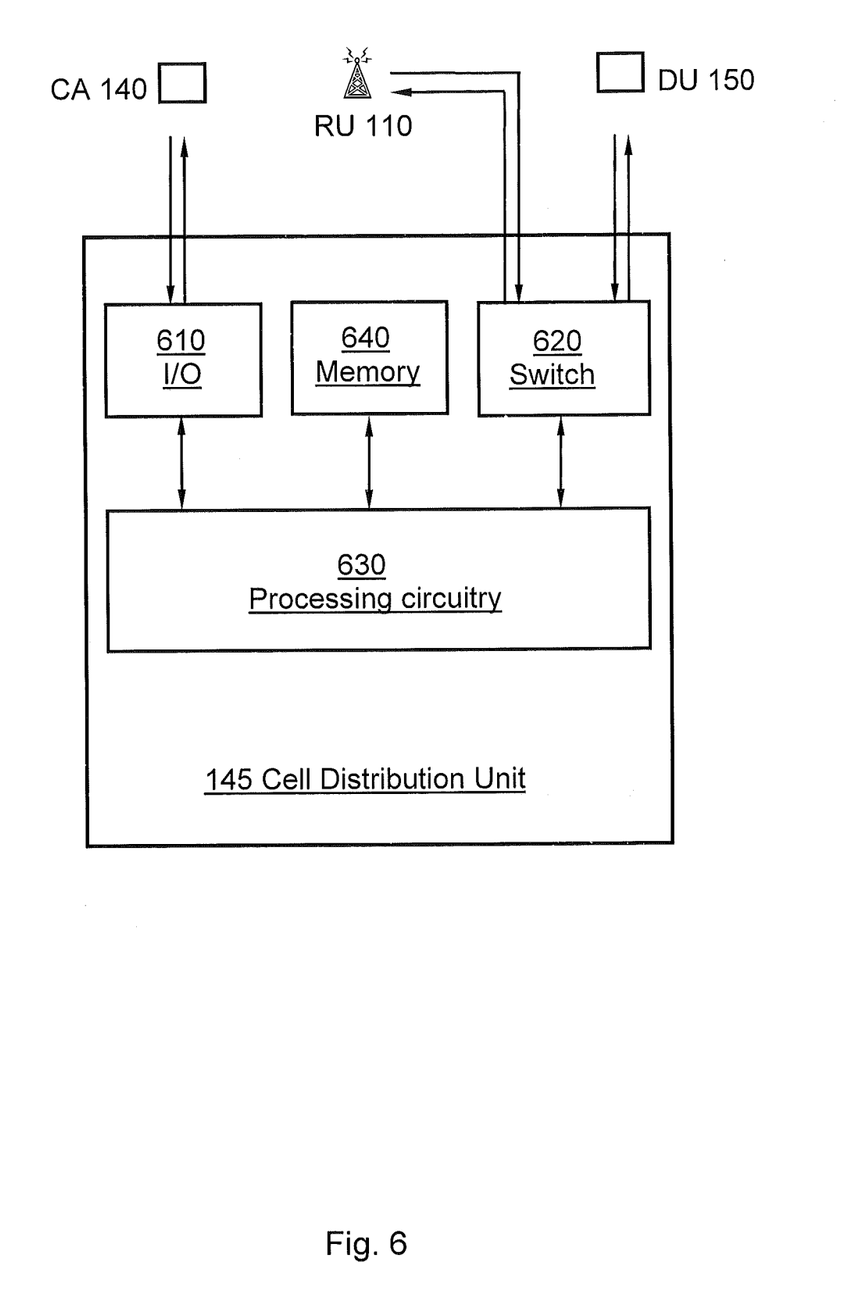
FIG. 6 is a block diagram illustrating a cell distribution unit according to some embodiments.

FIG. 6 is a block diagram illustrating a cell distribution unit 145, which may be comprised in the communication system 100 according to some embodiments.

For the sake of clarity, any internal electronics or other components of the cell distribution unit 145, not completely needed for understanding the present method has been omitted from FIG. 6.

The cell distribution unit 145 may be configured to connect the radio unit 112 serving the cell 122 with an allocated baseband resource in a digital unit 150, 151, 152, 153, 154, 155 upon request, according to some embodiments. Further, the cell distribution unit 145 may be notified which baseband resource has been allocated to the radio unit 112 serving the cell 122, by the communication system 100.

The cell distribution unit 145 may comprise an input/output (I/O) interface 610, configured to transmit and receive, respectively, data to/from the communication system 100, and/or the cell allocator 140. The communication of data over the I/O interface 610 may be wired or wireless, according to different embodiments.

The cell distribution unit 145 may be configured to receive, via the I/O interface 610 a notification concerning which baseband resource has been allocated to the radio unit 112 serving the cell 122. The notification may be received from the cell allocator 140 or from another entity within the communication system 100 performing corresponding functionality. In addition, the cell distribution unit 145 may be configured to receive, via the I/O interface 610, an indication, indicating that the radio unit 112 requires baseband resource. Such indication may be explicit or implicit, according to different embodiments, and may be received from the radio unit 112 or from the cell allocator 140.

The cell distribution unit 145 may further comprise a switch 620, configured to connect the radio unit 112 requiring the baseband resource with the allocated baseband resource in the digital unit 150, 151, 152, 153, 154, 155.

The cell distribution unit 145 may further comprise a processing circuitry 630, according to some embodiments. The processing circuitry 630 may comprise e.g. one or more instances of a Central Processing Unit (CPU), a processing unit, a processor, a microprocessor, or other processing logic that may interpret and execute instructions. The processing circuitry 630 may further perform data processing functions for inputting, outputting, and processing of data comprising data buffering and device control functions, such as call processing control, user interface control, or the like.

According to some embodiments, the cell distribution unit 145 may comprise at least one memory 640. The memory 640 may comprise a physical device utilized to store data or programs i.e. sequences of instructions, on a temporary or permanent basis. According to some embodiments, the memory 640 may comprise integrated circuits comprising silicon-based transistors. Further, the memory 640 may be volatile or non-volatile. The cell distribution unit 145 may further according to some embodiments comprise at least one volatile memory 640 and also at least one non-volatile memory 640.

Further, it is to be noted that some of the described units 610, 620, 630 and 640 comprised according to different embodiments within the cell distribution unit 145 in the communication system 100 may be regarded as separate logical entities but not with necessity separate physical entities.

When using the formulation "comprise" or "comprising" within the present context, it is to be interpreted as non-limiting, i.e. meaning "consist at least of". The present methods and devices are not limited to the above described preferred embodiments. Various alternatives, modifications and equivalents may be used. Therefore, the above embodiments are not to be taken as limiting the scope of claimed protection, which instead is to be defined by the appending claims.

The invention claimed is:

1. A method in a communication system comprising a plurality of digital units and a radio unit serving a cell, the method for allocating an amount of baseband resource in one of the plurality of digital units to the radio unit comprising:
   estimating the amount of the baseband resource to be allocated to the radio unit;
   identifying a digital unit of the plurality of digital units on which a neighbor radio unit, serving a neighbor cell situated in a geographical vicinity of the cell, is allocated baseband resource, wherein the plurality of digital units comprise a baseband pool of digital units that is configured to serve a plurality of cells including the cell and the neighbor cell;
   determining that the digital unit of the plurality of digital units on which a neighbor radio unit is allocated baseband resource has available baseband resource of the estimated amount;
   allocating the estimated amount of baseband resource in the digital unit of the plurality of digital units on which a neighbor radio unit is allocated baseband resource to the radio unit serving the cell if it is determined that the digital unit has available baseband resource of the estimated amount; and
   reallocating the allocated baseband resources in any of the plurality of digital units, wherein reallocating comprises:
      determining an amount of allocated baseband resources in a first digital unit of the plurality of digital units;
      determining an amount of non-allocated baseband resources in a second digital unit of the plurality of digital units;
      detecting that the first digital unit has a determined amount of allocated baseband resources which is equal to or smaller than the determined amount of non-allocated baseband resources of the second digital unit; and
      reallocating baseband resource of the first digital unit to the second digital unit.

2. The method of claim 1, wherein estimating the amount of baseband resource to be allocated to the radio unit comprises estimating the amount based on at least one parameter related to resource utilization in the cell served by the radio unit.

3. The method of claim 1, wherein estimating comprises predicting a future requirement of baseband resource within a future period of time based on information related to future resource utilization in the cell served by the radio unit.

4. The method of claim 1, further comprising reducing size of the estimated amount of baseband resource to be allocated to the radio unit, in comparison with requirements of the radio unit based on a load of the cell and/or predicted future load of the cell.

5. The method of claim 1, wherein identifying comprises identifying the digital unit on which most of the neighbor radio units are allocated baseband resources when a plurality of digital units are identified on which different neighbor radio units are allocated baseband resources.

6. The method of claim 1, wherein identifying comprises acquiring a neighbor cell list associated with the cell.

7. The method of claim 1, further comprising:
   detecting an isolated radio unit with allocated baseband resource on one of the plurality of digital units and no baseband resource being allocated to any neighbor radio unit of the isolated radio unit; and
   reallocating the baseband resource allocated to the isolated radio unit to another digital unit.

8. The method of claim 1, wherein the communication system further comprises:
a user plane aggregator configured to keep track of where, within the plurality of digital units the radio unit, which is serving the cell is allocated baseband resource; and
a cell distribution unit, configured to connect the radio unit serving the cell with the allocated baseband resource in the digital unit upon request, the method further comprising:
notifying the cell distribution unit and the user plane aggregator which baseband resource has been allocated to the radio unit serving the cell.

9. The method of claim 8, further comprising obtaining, at the user plane aggregator, a notification concerning which baseband resource has been allocated to the radio unit serving the cell.

10. The method of claim 8, further comprising forwarding, at the user plane aggregator, data from a core network, intended to be received by the radio unit serving the cell, to the digital unit on which the radio unit has been allocated the baseband resource.

11. The method of claim 8, further comprising receiving, at the cell distribution unit, a notification concerning which baseband resource has been allocated to the radio unit serving the cell;
receiving, at the cell distribution unit, an indication, indicating that the radio unit requires baseband resource; and
connecting, at the cell distribution unit, the radio unit requiring the baseband resource with the allocated baseband resource in the digital unit.

12. The method of claim 1, wherein at least one of the plurality of digital units other than the identified digital unit of the plurality of digital units is closed down.

13. A communication system comprising a plurality of digital units and a radio unit serving a cell, which communication system is configured for allocating an amount of baseband resource in one of the plurality of digital units to the radio unit, the communication system comprising:
processing circuitry configured to:
estimate the amount of baseband resource to be allocated to the radio unit;
identify a digital unit of the plurality of digital units on which a neighbor radio unit, serving a neighbor cell, situated in a geographical vicinity of the cell, is allocated baseband resource, wherein the plurality of digital units comprise a baseband pool of digital units that is configured to serve, a plurality of cells including the cell and the neighbor cell;
determine that the digital unit of the plurality of digital units on which a neighbor radio unit is allocated baseband resource has available baseband resource of the estimated amount; and
allocate the estimated amount of baseband resource in the digital unit of the plurality of digital units on which a neighbor radio unit is allocated baseband resource to the radio unit serving the cell; and
reallocate the allocated baseband resources in any of the plurality of digital units, wherein the processing circuitry is configured to reallocate the allotted baseband resources by:
determining an amount of allocated baseband resources in a first digital unit of the plurality of digital units;
determining an amount of non-allocated baseband resources in a second digital unit of the plurality of digital units;
detecting that the first digital unit has a determined amount of allocated baseband resources which is equal to or smaller than the determined amount of non-allocated baseband resources of the second digital unit; and
reallocating baseband resource of the first digital unit to the second digital unit.

14. The communication system of claim 13, wherein the processing circuitry is further configured to estimate the amount of baseband resource to be allocated to the radio unit based on at least one parameter related to resource utilization in the cell served by the radio unit.

15. The communication system of claim 13, wherein the processing circuitry is further configured to estimate the amount of baseband resource by predicting a future requirement of baseband resource within a future period of time-based on information related to future resource utilization in the cell served by the radio unit.

16. The communication system of claim 13, wherein the processing circuitry is further configured to reduce size of the amount of baseband resource to be allocated to the radio unit, in comparison with requirements of the radio unit, based on the load of the cell and/or predicted future load of the cell.

17. The communication system of claim 13, wherein the processing circuitry is further configured to identify the digital unit on which most of the neighbor radio units are allocated baseband resources.

18. The communication system of claim 13, wherein the processing circuitry is further configured to acquire a neighbor cell list associated with the cell in order to identify the digital unit on which the neighbor radio unit serving the neighbor cell, is allocated baseband resource.

19. The communication system of claim 13, wherein the processing circuitry is further configured to:
detect an isolated radio unit with allocated baseband resource on one of the plurality of digital units-and no baseband resources being allocated to any neighbor radio unit of the isolated radio unit; and
reallocate the baseband resource allocated to the isolated radio unit to. another digital unit.

20. The communication system claim 13, wherein the communication system further comprises:
a user plane aggregator configured to keep track of where, within the plurality of digital units, the radio unit, which is serving the cell is allocated baseband resource; and
a cell distribution unit, configured to connect the radio unit serving the cell with the allocated baseband resource in the digital unit upon request,
wherein the processing circuitry is further configured to notify the cell distribution unit and the user plane aggregator which baseband resource has been allocated to the radio unit serving the cell.

21. The communication system of claim 13, wherein the communication system further comprises a cell allocator for allocating the baseband resource in the digital unit to the radio unit, which is serving the cell, and wherein the processing circuitry is included in the cell allocator.

22. The communication system of claim 20, wherein the user plane aggregator comprises a receiver, configured to receive a notification from the cell allocator, concerning which baseband resource has been allocated to the radio unit serving the cell.

23. The communication system of claim 20, wherein the user plane aggregator further comprises a transmitter configured to forward data from a core network, to be received by the radio unit serving the cell, to the digital unit on which the radio unit has been allocated the baseband resource.

24. The communication system of claim 20, wherein the cell distribution unit comprises:
- an input/output interface, configured to receive a notification from the cell allocator, concerning which baseband resource has been allocated to the radio unit serving the cell, and configured to receive an indication from the cell allocator, indicating that the radio unit requires baseband resource; and
- a switch configured to connect the radio unit requiring the baseband resource with the allocated baseband resource in the digital unit.

25. The communication system of claim 13, wherein at least one of the plurality of digital units other than the identified digital unit of the plurality of digital units is closed down.

* * * * *